Patented Oct. 4, 1927.

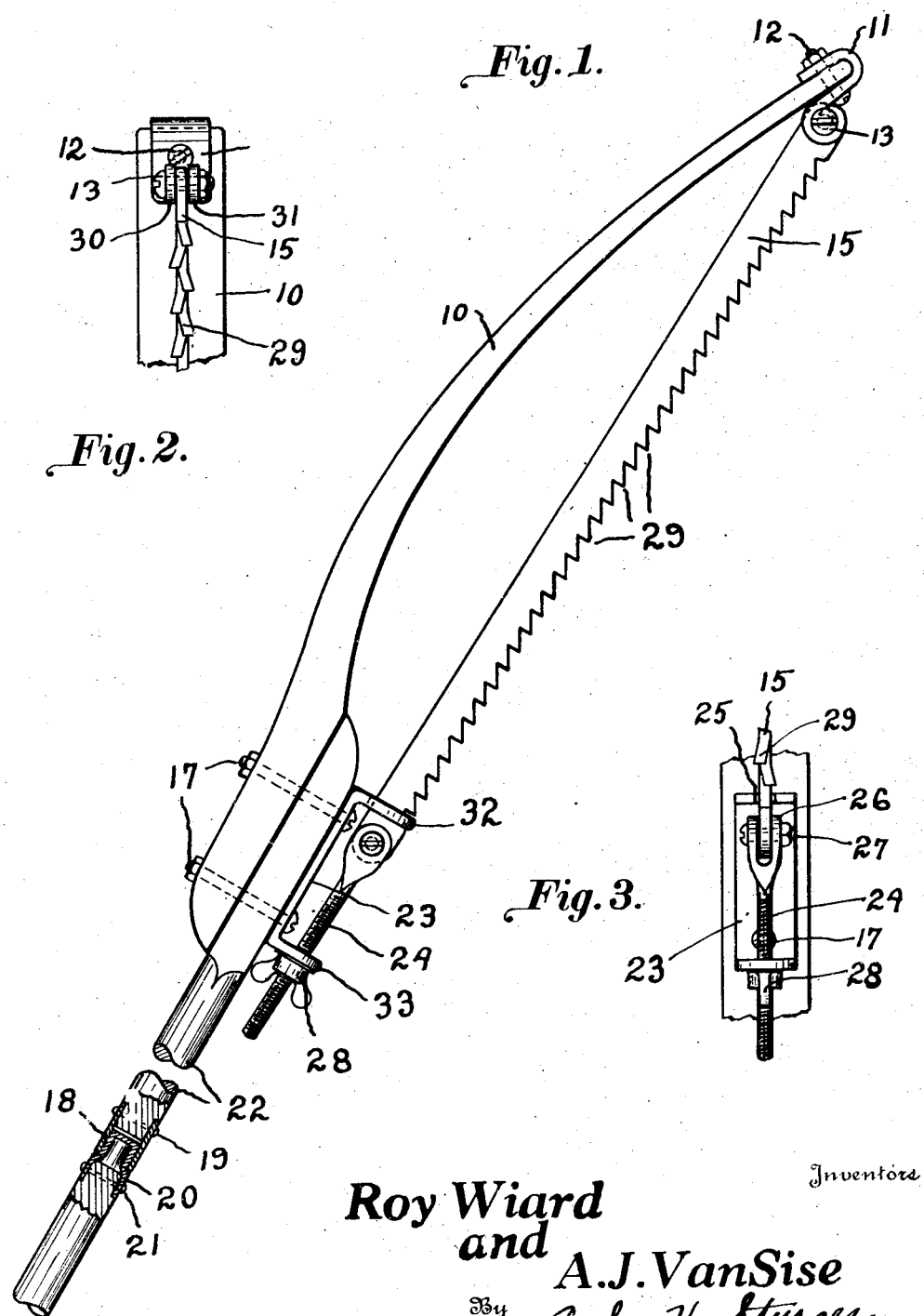

1,644,316

UNITED STATES PATENT OFFICE.

ROY WIARD AND ANDREW J. VAN SISE, OF AUDUBON, IOWA.

TREE SAW.

Application filed September 28, 1925. Serial No. 59,030.

The present invention relates to improvements in saws, and has for an object to provide a light, strong saw suitable for the sawing off of limbs of trees at a great height by an operator remaining upon the ground.

It is another object of the invention to secure in a light structure of this kind a blade that is strung very taut whereby the work may be done conveniently, quickly and efficiently without entailing bending or buckling of the blade.

A further object of the invention resides in so constructing and arranging the various parts as to admit of easy removal and adjustability in the blade, to dispose the teeth so that they may perform the cutting operation when the blade is drawn toward the operator; and to provide a handle of great length made in jointed sections, so that it may be added to as required.

Another object of the invention is to provide an elongated insulated handle free from lead paint so that when sawing near live wires, and if the saw comes into contact with the wire, the wires will not be grounded through the handle to the injury and probable death of the operator.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side view of the improved saw with a portion of the handle broken away.

Figure 2 is an edge view of the tip of the bow looking at the edge of the saw teeth, and Figure 3 is a similar view showing the stretching means and the saw blade guide.

Referring more particularly to the drawings, 10 designates a bow preferably formed of wood, such as yew, hickory or the like; although this bow may be of spring steel. In any event the bow is arranged to be held under considerable tension when the saw blade 15 is held therein for operation, this saw blade being thin and light as is also the bow 10, rigidity in both the bow and saw blade being secured by the tension of these parts rather than by thickness, bulk of material and weight.

The outer end of the bow 10 is enveloped by a U-shaped clip 11 held in place by the bolt 12 passing through the side legs of the clip and through the enveloped portion of the bow. The clip at one side is provided with rolled over parts affording the space eyes 30 and 31 between which the outer end of the thin saw blade 15 is received. A bolt 13 is arranged to pass through the eyes 30 and 31 and the saw blade 15 for holding this blade in position and against rotary twisting movement which is also prevented by the lateral support given to the saw blade by the eyes 30 and 31 which hug it closely.

The inner end of the bow 10 is flattened and made straight to receive the flattened and straight portion of the first pole section 22, bolts 17 being employed to hold the bow and the pole section together. The pole sections may be provided in any required number and these sections may be of a suitable length, so that by adding to the sections a handle of requisite length is had. Joints are made for conveniently attaching the pole sections axially. One form of connection is shown in Figure 2 as comprising the internally threaded socket members 18 pinned, as shown at 19 to one pole section and adapted to receive the externally threaded companion jointing member 20 of the adjacent section, which is also pinned, as indicated at 21 to such adjoining section. By screwing or unscrewing the jointing members, the pole or handle sections may be coupled or disassembled. The bolts 17 also provide for holding the yoke 23 to the first pole section. This yoke member 23 is provided with the lugs 32 and 33, the lug 32 having a plain-walled opening therein, as indicated in Figure 3, to receive the thin saw blade 15 at its inner end and also to reinforce and strengthen this thin saw blade to prevent rotary twisting movement therein. The other lug 33 is perforated to receive the threaded bolt 24 having the wing nut 28 taking against the inner side of said lug, whereby to place the thin blade 15 and the bow 10 under tension and to hold it in this condition. The outer end of the bolt 24 is bifurcated as indicated at 26 in order to straddle the inner end of the thin saw blade 15. Attachment is made between the saw blade and bifurcated end of the bolt by the fastening 27.

The teeth 29 of the saw blade are shown as being shaped to cut when the saw is drawn toward the operator, although the teeth may be otherwise arranged.

In use of the device, high-power electric transmission lines pass through the limbs of trees, which require cutting from time to time in order to avoid short circuits. This has proved to be dangerous work for the linemen who were previously required to climb into the trees. The situation also proved to be unhandy for the conduct of the work. Inasmuch as wires are rarely strung higher than 30 ft., it becomes possible for the operator to accomplish the work from the ground provided a sufficiently light tool is to be had. The long handle required makes it imperative that lightness be secured. The bow 10 when not in use should be unstrung; otherwise the resiliency of the wood will become impaired and destroyed. The invention provides easy means for doing this. To string up the saw, the clip 11, which protects the end of the wood from splitting, is pressed against some object, thereby bending the bow to the form shown in Figure 1, the bolt 24 being passed through the lugs 32 and 33 and the inner end of the blade being placed in the slot 25. The operator now rotates the wing nut 28 while the tension on the blade is relieved on account of the bow being bent by pressing against some solid object. After a sufficient degree of tension is secured the implement is ready for use. A large amount of tension is required in order to hold the blade rigid and to prevent twisting movement. The operator now adds the required amount of the handle or pole sections to reach into the tree. The implement is drawn toward the operator in the act of sawing through the limb. The tool is used to best advantage when inclined at an angle of substantially 30 degrees.

We do not wish to be restricted to the size, form and proportions of the various parts, and obviously changes could be made in the construction herein described without departing from the spirit of the invention, it being only necessary that such changes fall within the scope of the appended claims.

What is claimed is:—

1. A saw comprising a bow of flexible material, a handle section secured at one end of said bow, a yoke secured to said handle section and having lugs, a clip attached to the other end of the bow, a thin, light saw blade carried by said clip and extending through one of the lugs of said yoke, and means coupled to the other end of said saw blade and cooperating with the other lug of the yoke for placing said blade and bow under tension.

2. A saw comprising a light flexible bow having a flattened end portion, a handle made up of jointed sections, the section nearest said bow having a flattened portion to engage the flattened portion of the bow, a yoke having lugs secured to said flat portion of said handle sections, a clip engaged about the outer end of the bow and having spaced eyes, a thin light saw blade having its outer end fitted between the eyes, and reinforced laterally thereby, and fastening means for securing the saw blade in the eyes, one of said lugs of the yoke having an opening to receive said blade, the sides of the opening reinforcing the blade against twisting movement, a bolt coupled to the inner end of said saw blade and passing through the other lug of the yoke, and a nut on said bolt engaging said last mentioned lug for placing the blade and yoke under tension.

In testimony whereof, we have affixed our signatures.

ROY WIARD.
ANDREW J. VAN SISE.